(12) United States Patent
de Dinechin et al.

(10) Patent No.: US 7,330,942 B2
(45) Date of Patent: Feb. 12, 2008

(54) METHOD FOR EFFICIENT VIRTUALIZATION OF PHYSICAL MEMORY IN A VIRTUAL-MACHINE MONITOR

(75) Inventors: Christophe de Dinechin, Roguebrune sur Argens (FR); Todd Kjos, Los Altos, CA (US); Jonathan Ross, Woodinville, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 11/027,553

(22) Filed: Dec. 29, 2004

(65) Prior Publication Data

US 2006/0026383 A1     Feb. 2, 2006

Related U.S. Application Data

(63) Continuation-in-part of application No. 10/909,965, filed on Jul. 31, 2004, now abandoned.

(51) Int. Cl.
*G06F 12/00*    (2006.01)
*G06F 9/00*     (2006.01)

(52) U.S. Cl. .................. 711/152; 711/206; 711/207

(58) Field of Classification Search ............... 711/152, 711/206, 207
See application file for complete search history.

(56) References Cited

U.S. PATENT DOCUMENTS

| 6,904,490 B2 * | 6/2005 | Arimilli et al. ............... 711/5 |
| 6,947,051 B2 * | 9/2005 | Gossalia et al. ............ 345/543 |
| 6,968,398 B2 * | 11/2005 | Davis et al. .................. 710/3 |
| 2004/0064668 A1 * | 4/2004 | Kjos et al. ................... 711/202 |

* cited by examiner

*Primary Examiner*—Hyung Sough
*Assistant Examiner*—Hamdy S Ahmed

(57) ABSTRACT

Various embodiments of the present invention are directed to efficient provision, by a virtual-machine monitor, of a virtual, physical memory interface to guest operating systems and other programs and routines interfacing to a computer system through a virtual-machine interface. In one embodiment of the present invention, a virtual-machine monitor maintains control over a translation lookaside buffer ("TLB"), machine registers which control virtual memory translations, and a processor page table, providing each concurrently executing guest operating system with a guest-processor-page table and guest-physical memory-to-physical memory translations. In one embodiment, a virtual-machine monitor can rely on hardware virtual-address-translation mechanisms for the bulk of virtual-address translations needed during guest-operating-system execution, thus providing a guest-physical memory interface without introducing excessive overhead and inefficiency.

6 Claims, 15 Drawing Sheets

Application Register Set
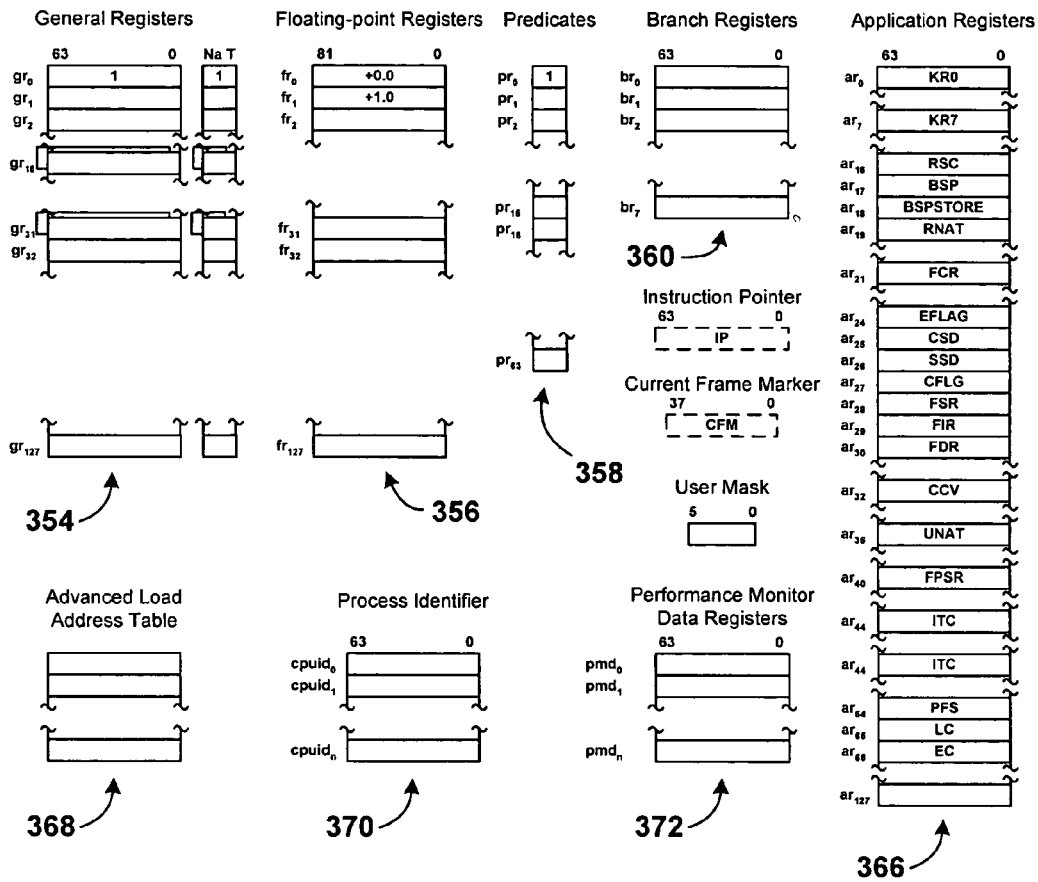
System Register Set
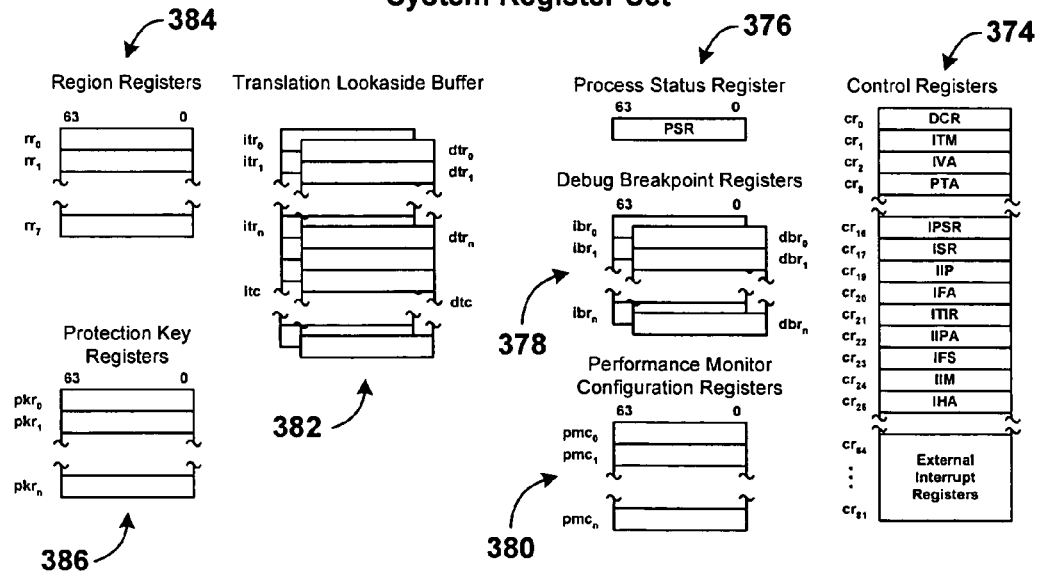
Figure 3B

| TLB.ar | TLB.pl | PRIVILEGE LEVEL | | | | DESCRIPTION |
|---|---|---|---|---|---|---|
| | | 3 | 2 | 1 | 0 | |
| 0 | 3 | R | R | R | R | READ ONLY —710 |
| | 2 |  | R | R | R | |
| | 1 |  |  | R | R | |
| | 0 |  |  |  | R | |
| 1 | 3 | RX | RX | RX | RX | READ, EXECUTE |
| | 2 |  | RX | RX | RX | |
| | 1 |  |  | RX | RX | |
| | 0 |  |  |  | RX | |
| 2 | 3 | RW | RW | RW | RW | READ, WRITE |
| | 2 |  | RW | RW | RW | |
| | 1 |  |  | RW | RW | |
| | 0 |  |  |  | RW | |
| 3 | 3 | RWX | RWX | RWX | RWX | READ, WRITE, EXECUTE |
| | 2 |  | RWX | RWX | RWX | |
| | 1 |  |  | RWX | RWX | |
| | 0 |  |  |  | RWX | |
| 4 | 3 | R | RW | RW | RW | READ ONLY/ READ, WRITE |
| | 2 |  | R | RW | RW | |
| | 1 |  |  | R | RW | |
| | 0 |  |  |  | RW | |
| 5 | 3 | RX | RX | RX | RWX | READ, EXECUTE/ READ, WRITE, EXEC |
| | 2 |  | RX | RX | RWX | |
| | 1 |  |  | RX | RWX | |
| | 0 |  |  |  | RWX | |
| 6 | 3 | RWX | RW | RW | RW | READ, WRITE, EXECUTE/ READ, WRITE |
| | 2 |  | RWX | RW | RW | |
| | 1 |  |  | RWX | RW | |
| | 0 |  |  |  | RW | |
| 7 | 3 | X | X | X | RX | EXEC, PROMOTE/ READ, EXECUTE |
| | 2 | XP2 | X | X | RX | |
| | 1 | XP1 | XP1 | X | RX | |
| | 0 | XP0 | XP0 | XP0 | RX | |

Figure 7

METHOD FOR EFFICIENT VIRTUALIZATION OF PHYSICAL MEMORY IN A VIRTUAL-MACHINE MONITOR

CROSS REFERENCE TO RELATED APPLICATION

This application is a continuation in part of U.S. patent application Ser. No. 10/909,965, filed Jul. 31, 2004 now abandoned.

TECHNICAL FIELD

The present invention is related to computer architecture, operating systems, and virtual-machine monitors, and, in particular, to methods, and virtual-machine monitors employing the methods, for efficiently virtualizing physical memory and virtual-address translation mechanisms.

BACKGROUND OF THE INVENTION

During the past 50 years, computer hardware, architecture, and operating systems that run on computers have evolved to provide ever-increasing storage space, execution speeds, and features that facilitate computer intercommunication, security, application-program development, and ever-expanding range of compatibilities and interfaces to other electronic devices, information-display devices, and information-storage devices. In the 1970's, enormous strides were made in increasing the capabilities and functionalities of operating systems, including the development and commercial deployment of virtual-memory techniques, and other virtualization techniques, that provide to application programs the illusion of extremely large address spaces and other virtual resources. Virtual memory mechanisms and methods provide 32-bit or 64-bit memory-address spaces to each of many user applications concurrently running on computer system with far less physical memory.

Virtual machine monitors provide a powerful new level of abstraction and virtualization. A virtual machine monitor comprises a set of routines that run directly on top of a computer machine interface, and that, in turn, provides a virtual machine interface to higher-level programs, such as operating systems. An operating system, referred to as a "guest operating system," runs above, and interfaces to, a well-designed and well-constructed virtual-machine interface just as the operating system would run above, and interface to, a bare machine.

A virtual-machine monitor uses many different techniques for providing a virtual-machine interface, essentially the illusion of a machine interface to higher-level programs. A virtual-machine monitor may pre-process operating system code to replace privileged instructions and certain other instructions with patches that emulate these instructions. The virtual-machine monitor generally arranges to intercept and emulate the instructions and events which behave differently under virtualization, so that the virtual-machine monitor can provide virtual-machine behavior consistent with the virtual machine definition to higher-level software programs, such as guest operating systems and programs that run in program-execution environments provided by guest operating systems. The virtual-machine monitor controls physical machine resources in order to fairly allocate physical machine resources among concurrently executing operating systems and preserve certain physical machine resources, or portions of certain physical machine resources, for exclusive use by the virtual-machine monitor.

As part of providing a virtual-machine interface, a virtual-machine monitor needs to provide, to each concurrently executing guest operating system executing above the virtual-machine interface, a virtualized, guest-physical memory and a virtualized guest-virtual-address-translation system that the guest operating system considers to be the actual physical memory of a machine, but which, in fact, is an abstraction provided by the virtual-monitor using underlying machine resources. Virtual-address translation and physical memory access are critical bottlenecks for overall guest-operating-system performance. A virtual-machine monitor therefore needs to employ efficient techniques for providing a guest-physical memory interface to guest operating systems. If, for example, each access to physical memory through virtual addresses by guest operating systems were to generate interruptions that need handling by the virtual-machine monitor, guest-operating-system performance would slow to unacceptable levels. For this reason, designers, implementers, manufacturers, and users of virtual-machine monitors and virtual-monitor-containing computer systems have recognized a need for efficient methods by which virtual-machine monitors can provide a guest-physical memory interface and a guest-virtual-address-translation-system interface to programs interfacing to underlying machine resources through a virtual-monitor-provided virtual-machine interface.

SUMMARY OF THE INVENTION

Various embodiments of the present invention are directed to efficient provision, by a virtual-machine monitor, of a virtual, physical memory interface to guest operating systems and other programs and routines interfacing to a computer system through a virtual-machine interface. In one embodiment of the present invention, a virtual-machine monitor maintains control over a translation lookaside buffer ("TLB"), machine registers which control virtual memory translations, and a processor page table, providing each concurrently executing guest operating system with a guest-processor-page table and guest-physical memory-to-physical memory translations. In one embodiment, a virtual-machine monitor can rely on hardware virtual-address-translation mechanisms for the bulk of virtual-address translations needed during guest-operating-system execution, thus providing a guest-physical memory interface without introducing excessive overhead and inefficiency.

BRIEF DESCRIPTION OF THE DRAWINGS

FIGS. 3A-B show the registers within an Itanium processor.

FIG. 7 shows the access rights encoding used in a TLB entry.

DETAILED DESCRIPTION OF THE INVENTION

Embodiments of the present invention are directed to virtualization of physical memory within the computer system by a virtual-machine monitor in an efficient manner to provide guest operating system with a guest-physical memory interface and a virtual-address-translation-system interface as part of a virtual-machine interface. A described embodiment makes use of Intel Itanium® architecture features. Additional information concerning virtual memory, virtual-machine monitors, and the Itanium architecture are first provided, in a following subsection, followed by a detailed discussion of several embodiments of the present invention, in a subsequent subsection.

Figure 1:
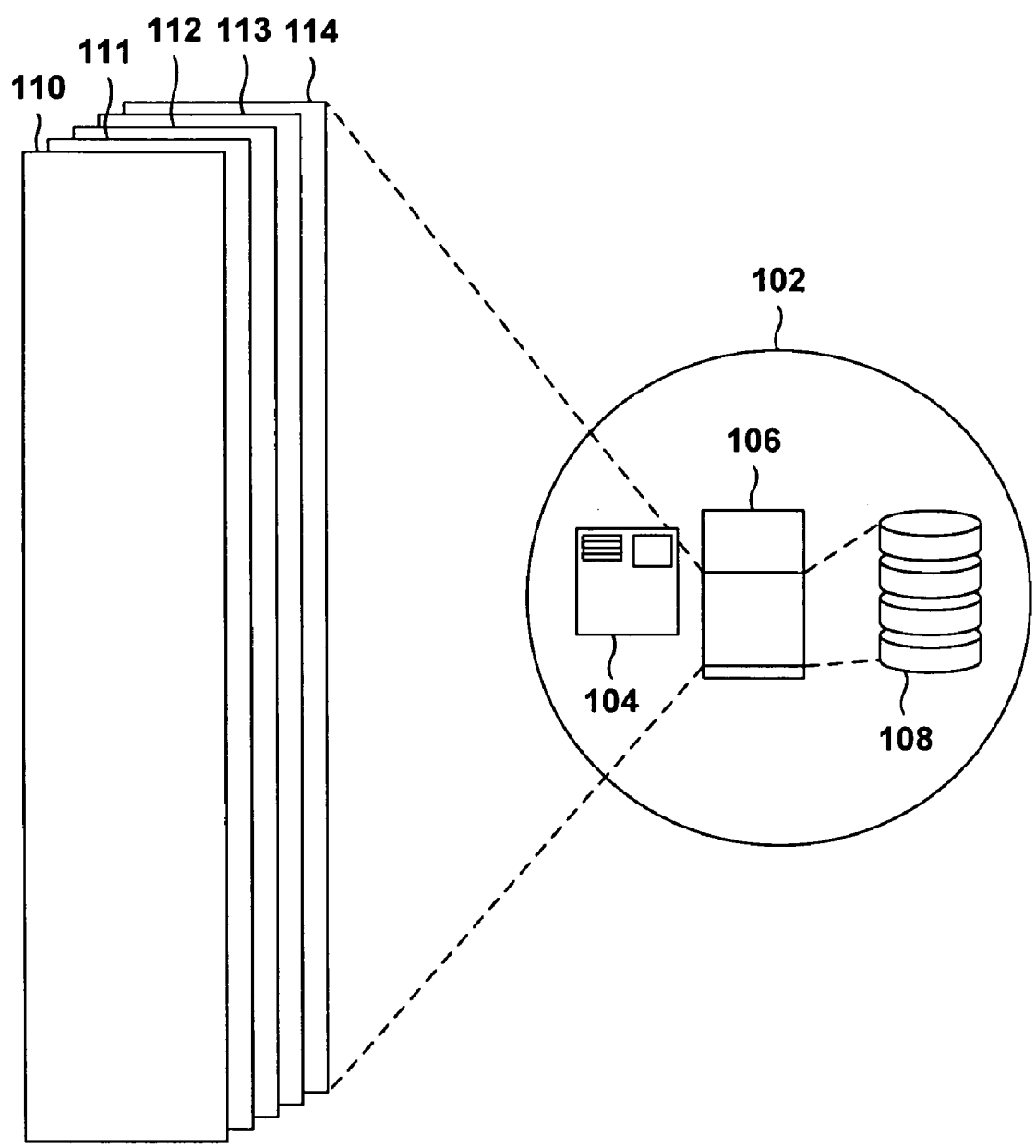
FIG. 1 illustrates virtual memory provided by a combined operating-system/hardware system.

Additional Information About Virtual Memory, Virtual Monitors, and the Intel® Itanium Computer Architecture Virtual Memory FIG. 1 illustrates virtual memory provided by a combined operating-system/hardware system. In FIG. 1, the operating system is abstractly represented as a circle 102 enclosing hardware components including a processor 104, physical memory 106, and mass-storage devices 108. FIG. 1 is intended to abstractly represent certain features of the hardware system, or machine, rather than to accurately represent a machine or enumerate the components of a machine. In general, the operating system provides, to each process executing within the execution environment provided by the operating system, a large virtual-memory address space, represented in FIG. 1 by vertical columns external to the operating system, such as vertical column 110. The virtual-memory address space defines a sequence of addressable memory bytes with addresses ranging from 0 to $2^{64}-1$ for a combined operating-system/hardware system supporting 64-bit addresses. The Itanium virtual address space is up to 85 bits wide, comprising a 61-bit offset and a region identifier up to 24 bits in length, with a 64-bit address space accessible at any point in time. Depending on the machine and operating system, certain portions of the virtual-memory address space may be inaccessible to a process, and various mechanisms may be used to extend the size of the virtual-memory address space beyond the maximum size addressable by the machine-supported addressing unit. An operating system generally provides a separate virtual-memory address space to each process concurrently executing on top of the operating system, so that, as shown in FIG. 1, the operating system may simultaneously support a number of distinct and separate virtual-memory address spaces 110-114.

A virtual-memory address space is, in many respects, an illusion created and maintained by the operating system. A process or thread executing on the processor 104 can generally access only a portion of physical memory 106. Physical memory may constitute various levels of caching and discrete memory components distributed between the processor and separate memory integrated circuits. The physical memory addressable by an executing process is often smaller than the virtual-memory address space provided to a process by the operating system, and is almost always smaller than the aggregate size of the virtual-memory address spaces simultaneously provided by the operating system to concurrently executing processes. The operating system creates and maintains the illusion of relatively vast virtual-memory address spaces by storing the data, addressed via a virtual-memory address space, on mass-storage devices 108 and rapidly swapping portions of the data, referred to as pages, into and out from physical memory 106 as demanded by virtual-memory accesses made by executing processes. In general, the patterns of access to virtual memory by executing programs are highly localized, so that, at any given instant in time, a program may be reading to, and writing from, only a relatively small number of virtual-memory pages. Thus, only a comparatively small fraction of virtual-memory accesses require swapping of a page from mass-storage devices 108 to physical memory 106.

Virtual Monitors

Figure 2:
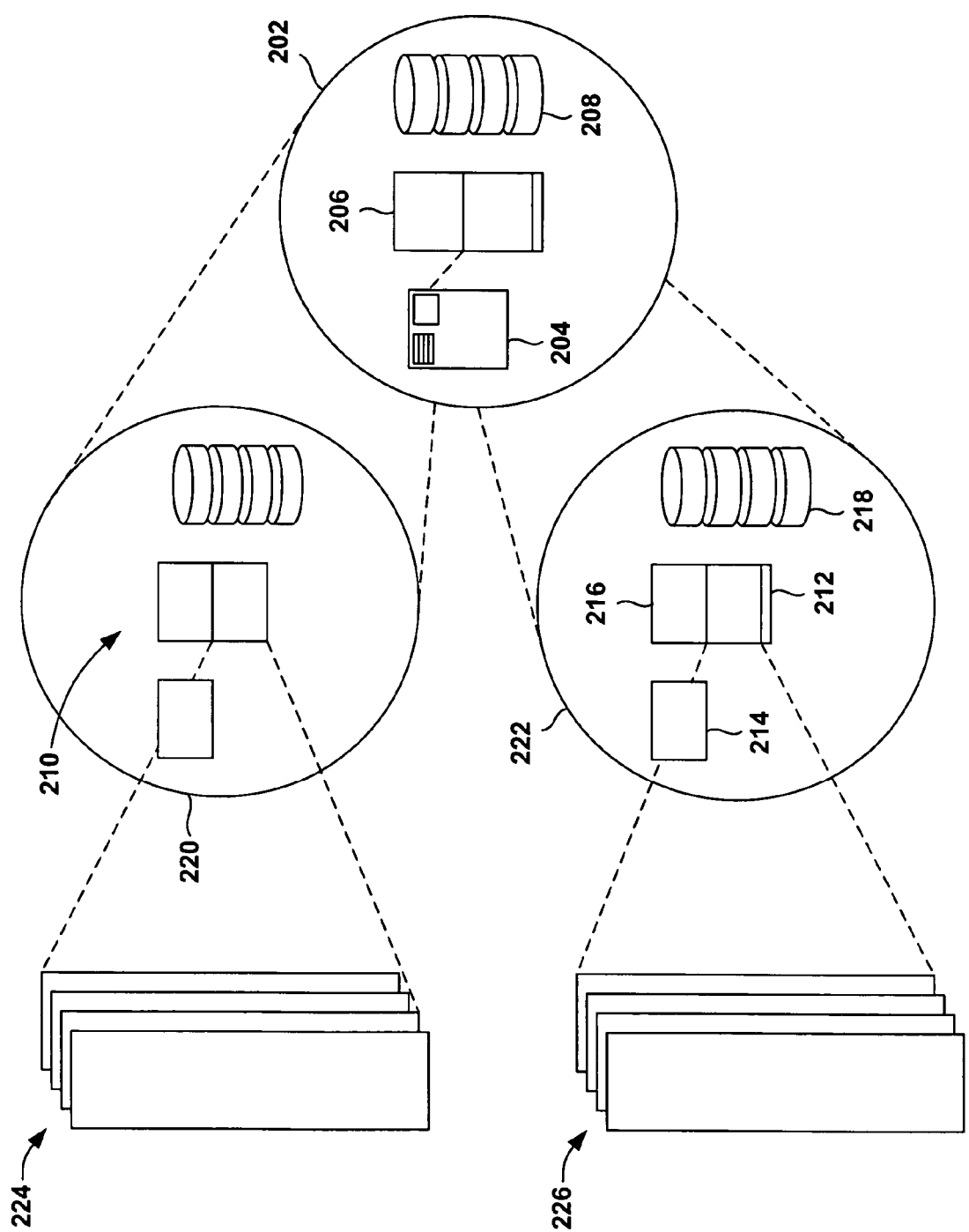
FIG. 2 illustrates a monitor-based approach to supporting multiple, concurrently executing operating systems.

A virtual-machine monitor is a set of routines that lie above the physical machine interface, and below all other software routines and programs that execute on a computer system. A virtual-machine monitor, also referred to as a "hypervisor" or simply as a "monitor," provides a virtual-machine interface to each operating system concurrently executing on the computer system. The virtual-machine interface includes those machine features and characteristics expected of a machine by operating systems and other programs that execute on machines. For example, a virtual-machine interface includes a virtualized virtual-memory-system interface. FIG. 2 illustrates a virtual-monitor-based approach to supporting multiple, concurrently executing operating systems. In FIG. 2, a first circle 202 encloses the physical processor 204, physical memory 206, and mass-storage devices 208 of a computer system. The first enclosing circle 202 represents a virtual-machine monitor, a software layer underlying the traditional operating-system software layer of the computer system. The virtual-machine monitor provides virtual-machine interfaces 210 and 212. The virtual machine can be considered to include a virtual processor, virtualized physical memory, and virtual mass-storage devices, e.g., 214, 216, 218, respectively. An operating system software layer can be considered to encapsulate each virtual machine, such as operating systems 220 and 222 represented by circles in FIG. 2. In turn, the operating systems each provide a number of guest-virtual-memory address spaces 224 and 226 to processes concurrently executing within the execution environments provided by the operating systems. The virtual-machine monitor may provide multiple virtual processors to guest operating systems, and may provide a different number of virtual processors than the number of physical processors contained in the computer system.

Intel Itanium® Architecture

Figure 3A:
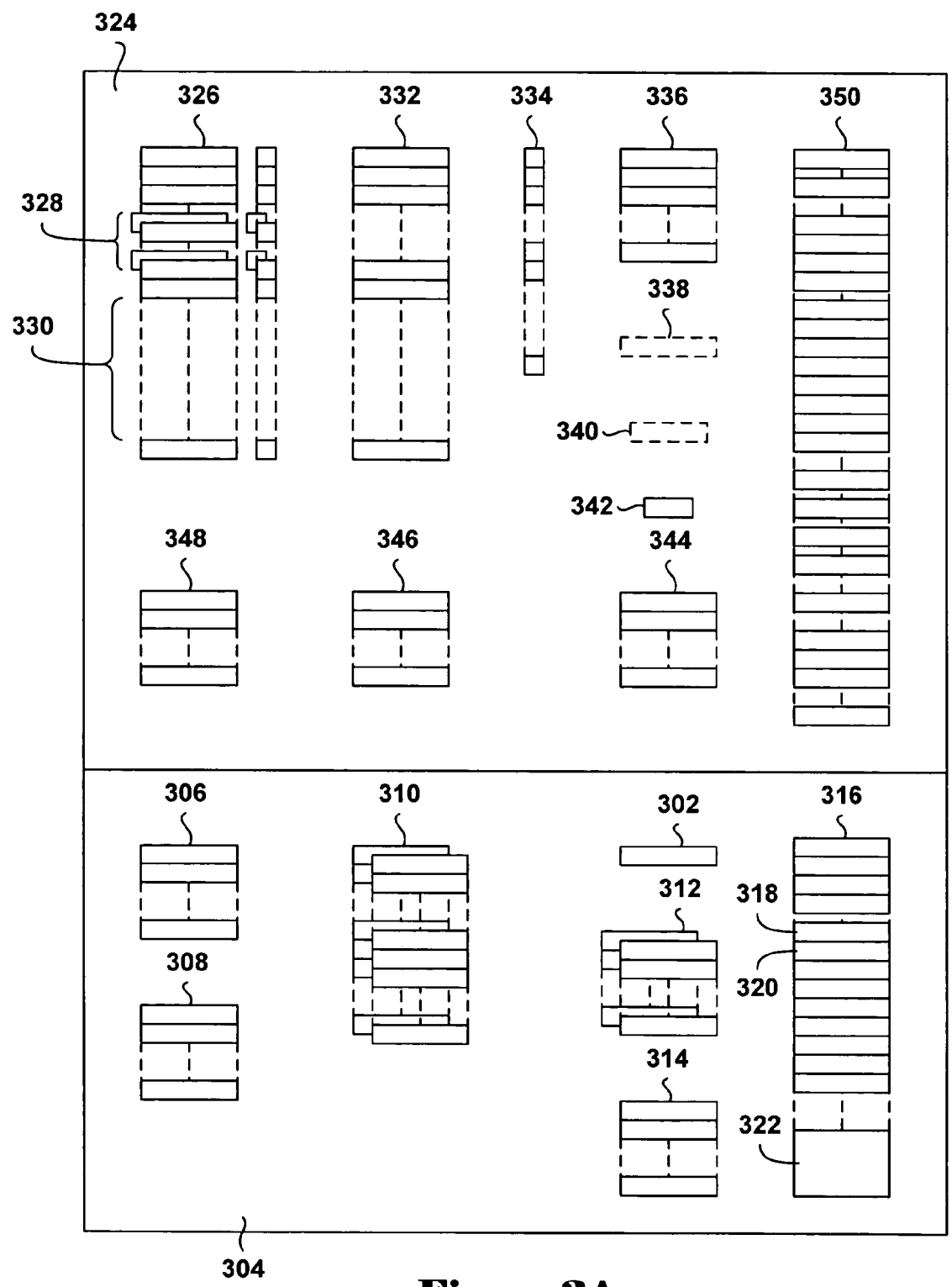
Figure 4:
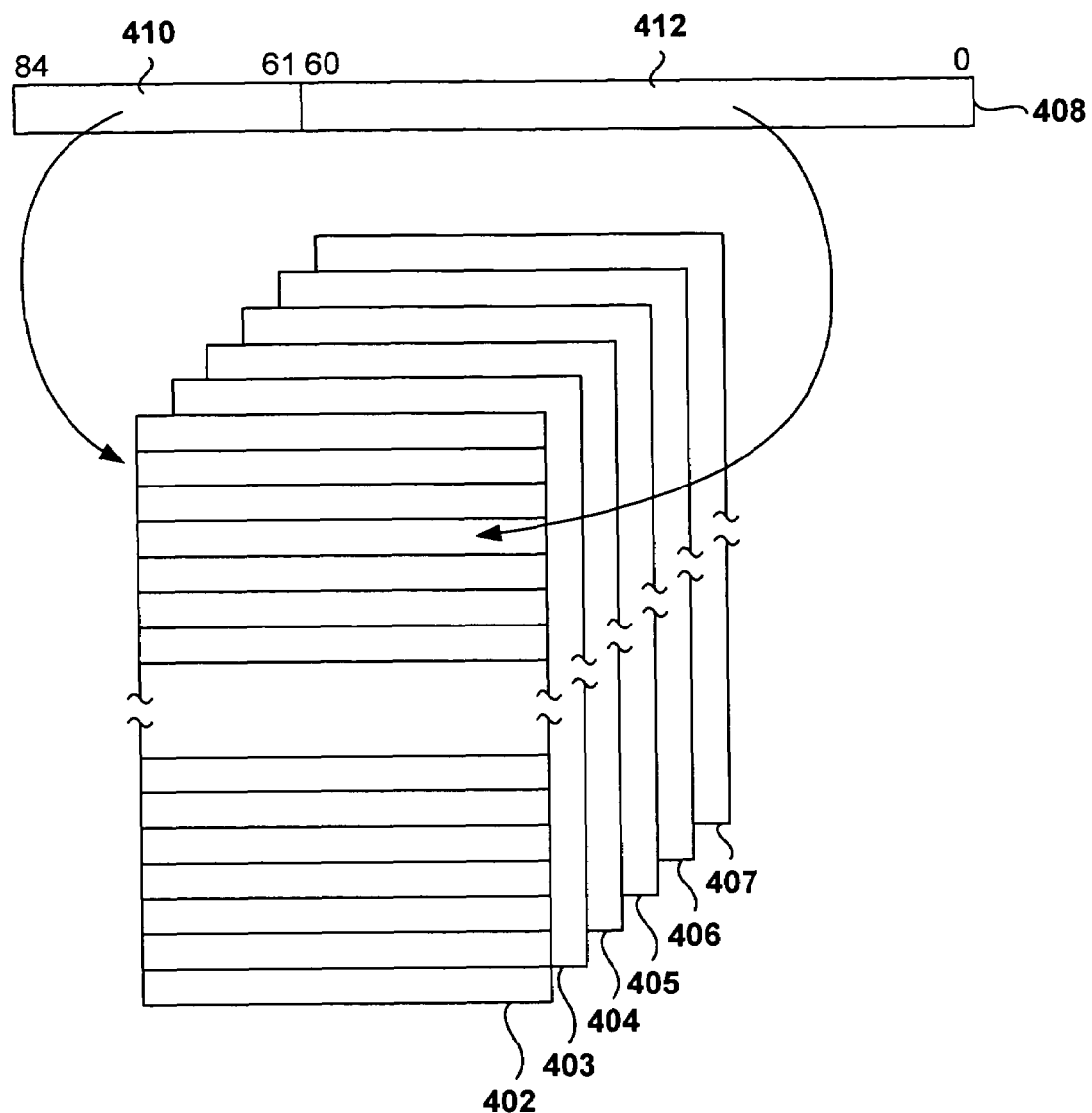
FIG. 4 illustrates the virtual address space provided by one modern computer architecture.

Processors, such as Intel Itanium® processors, built to comply with the Intel® Itanium computer architecture represent one example of a modern computer hardware platform suitable for supporting a monitor-based virtual machine that in turn supports multiple guest-operating-systems, in part by providing a virtualized physical memory and virtual-address translation facilities to each guest operating system, so that each guest operating system running above a virtual-machine monitor is implemented as if the guest operating system directly accesses physical memory and as if the guest operating system can directly program the memory management unit. FIGS. 3A-B show the registers within an Itanium processor. FIG. 3A is a block diagram showing the registers within the processor. The registers hold values that define the execution state of the processor, and, when saved to memory, capture the machine state of an executing process prior to stopping execution of the process. Restoring certain registers saved in memory allows for resumption of execution of an interrupted process. The register set shown in FIGS. 3A-B is quite complex, and only certain of the registers are described, below.

The process status register ("PSR") 302 is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The most privileged privilege level is privilege level 0. The least privileged privilege level is privilege level 3. Only processes executing at privilege level 0 are allowed to access and manipulate certain machine resources, including the subset of registers, known as the "system-register set," shown in FIG. 3A within the lower rectangle 304. One control register, the interruption processor status register ("IPSR") 318, stores the value of the PSR for the most recently interrupted process. The interruption status register ("ISR") 320 contains a number of fields that indicate the nature of the interruption that most recently occurred to an interruption handler when the PSR.ic field flips from "1," at the time of a fault or interrupt, to "0" as the interruption handler is invoked. Other control registers store information related to other events, such as virtual memory address translation information related to a virtual address translation fault, pointers to the last successfully executed instruction bundle, and other such information. Sets of external interrupt control registers 322 are used, in part, to set interrupt vectors. The IHA register stores an indication of a virtual hash page table location at which the virtual-address translation corresponding to a faulting virtual address should be found.

The registers shown in FIG. 3A in the upper rectangular region 324 are known as the "application-register set." These registers include a set of general registers 326, sixteen of which 328 are banked in order to provide immediate registers for interruption handling code. At least 96 general registers 330 form a general-register stack, portions of which may be automatically stored and retrieved from backing memory to facilitate linkages among calling and called software routines. The application-register set also includes floating point registers 332, predicate registers 334, branch registers 336, an instruction pointer 338, a current frame marker 340, a user mask 342, performance monitor data registers 344, processor identifiers 346, an advanced load address table 348, and a set of specific application registers 350.

FIG. 3B shows another view the registers provided by the Itanium architecture, including the 128 64-bit general purpose registers 354, a set of 128 82-bit floating point registers 356, a set of 64 predicate registers 358, a set of 64 branch registers 360, a variety of special purpose registers including application registers ("AR") $AR_0$ through $AR_{127}$ 366, an advance load address table 368, process-identifier registers 370, performance monitor data registers 372, the set of control registers ("CR") 374, ranging from $CR_0$ to $CR_{81}$, the PSR register 376, break point registers 378, performance monitor configuration registers 380, a translation lookaside buffer 382, region registers 384, and protection key registers 386. Note that particular AR registers and CR registers have acronyms that reflect their use. For example, AR register $AR_{17}$ 388, the backing-store-pointer register, is associated with the acronym BSP, and this register may be alternatively specified as the BSP register or the AR[BSP] register. In many of the registers, single bits or groups of bits comprise fields containing values with special meanings. For example, the two least significant bits within register AR[RSC] 390 together compose a mode field which controls how aggressively registers are saved and restored by the processor. These two bits can be notationally specified as "AR[RSC] .mode."

The memory and virtual-address-translation architecture of the Itanium computer architecture is described below, with references to FIGS. 4-7. The virtual address space defined within the Intel Itanium computer architecture includes $2^{24}$ regions, such as regions 402-407 shown in FIG. 4, each containing $2^{61}$ bytes that are contiguously addressed by successive virtual memory addresses. Thus, the virtual memory address space can be considered to span a total address space of $2^{85}$ bytes of memory. An 85-bit virtual memory address 408 can then be considered to comprise a 24-bit region field 410 and a 61-bit address field 412.

Figure 5:
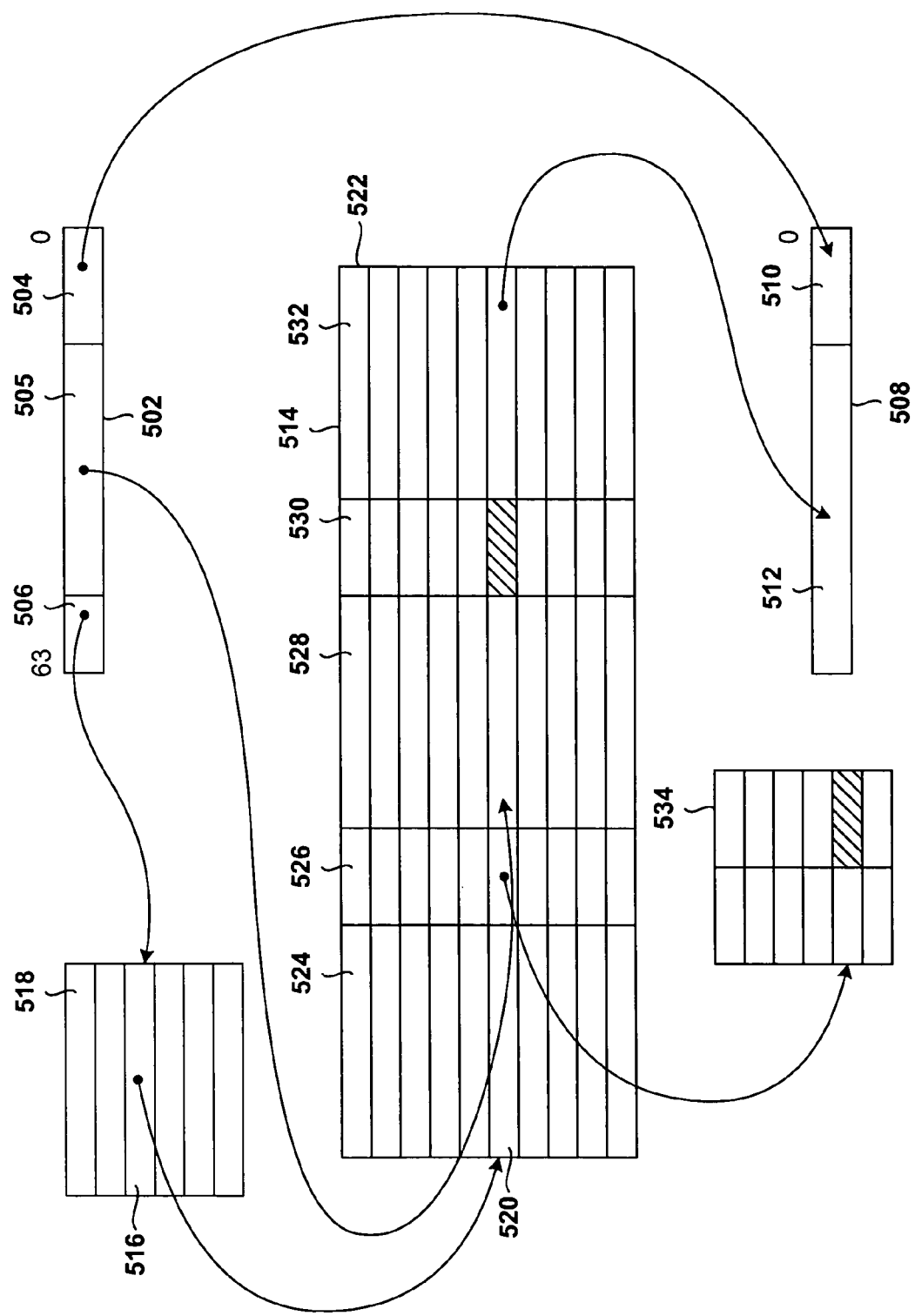
FIG. 5 illustrates translation of a virtual memory address into a physical memory address via information stored within region registers, protection key registers, and a translation look-aside buffer.

In general, however, virtual memory addresses are encoded as 64-bit quantities. FIG. 5 illustrates translation of a 64-bit virtual memory address into a physical memory address via information stored within region registers, protection key registers, and a translation look-aside register buffer ("TLB"). In the Intel® Itanium architecture, virtual addresses are 64-bit computer words, represented in FIG. 5 by a 64-bit quantity 502 divided into three fields 504-506. The first two fields 504 and 505 have sizes that depend on the size of a memory page, which can be adjusted within a range of memory page sizes. The first field 504 is referred to as the "offset." The offset is an integer designating a byte within a memory page. If, for example, a memory page contains 4096 bytes, then the offset needs to contain 12 bits to represent the values 0-4095. The second field 505 contains a virtual page address. The virtual page address designates a memory page within a virtual address space that is mapped to physical memory, and further backed up by memory pages stored on mass storage devices, such as disks. The third field 506 is a three-bit field that designates a region register containing the identifier of a region of virtual memory in which the virtual memory page specified by the virtual page address 505 is contained.

One possible virtual-address-translation implementation consistent with the Itanium architecture is next discussed. Translation of the virtual memory address 502 to a physical memory address 508 that includes the same offset 510 as the offset 504 in the virtual memory address, as well as a physical page number 512 that references a page in the physical memory components of the computer system, is carried out by the processor, at times in combination with operating-system-provided services. If a translation from a virtual memory address to a physical memory address is contained within the TLB 514, then the virtual-memory-address-to-physical-memory-address translation can be entirely carried out by the processor without operating system intervention. The processor employs the region register selector field 506 to select a register 516 within a set of region registers 518. The selected region register 516 contains a region identifier, up to 24 bits in length. One possible implementation conforming to the IPF architecture is for the processor to use the region identifier contained in the selected region register and the virtual page address 505 together in a hardware function to select a TLB entry 520 containing a region identifier and virtual memory address that match the region identifier contained in the selected region register 516 and the virtual page address 505. Each TLB entry, such as TLB entry 522, contains fields that include a region identifier 524, a protection key associated with the memory page described by the TLB entry 526, a virtual page address 528, privilege and access mode fields that together compose an access rights field 530, and a physical memory page address 532.

If a valid entry in the TLB, with present bit=1, can be found that contains the region identifier contained within the region register specified by the region register selector field of the virtual memory address, and that entry contains the virtual-page address specified within the virtual memory address, then the processor determines whether the virtual-memory page described by the virtual-memory address can be accessed by the currently executing process. The currently executing process may access the memory page if the access rights within the TLB entry allow the memory page to be accessed by the currently executing process and if either protection-key checking is disabled or the protection key within the TLB entry can be found within the protection key registers 534 in association with an access mode that allows the currently executing process access to the memory page. Protection-key matching is required only when the PSR.pk field of the PSR register is set. The access rights contained within a TLB entry include a 3-bit access mode field that indicates one, or a combination of, read, write, and execute privileges, and a 2-bit privilege level field that specifies the privilege level needed by an accessing process. Each protection key register contains a protection key of up to 24 bits in length associated with an access mode field specifying allowed read, write, and execute access modes and a valid bit indicating whether or not the protection key register is currently valid. Thus, in order to access a memory page described by a TLB entry, the accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB miss occurs and hardware may attempt to locate the correct TLB entry from an architected mapping control table, called the virtual hash page table ("VHPT"), located in protected memory, using a hardware-provided VHPT walker. If the hardware is unable to locate the correct TLB entry from the VHPT, a TLB-miss fault occurs and a kernel or operating system is invoked in order to find the specified memory page within physical memory or, if necessary, load the specified memory page from an external device into physical memory, and then insert the proper translation as an entry into the VHPT and TLB. If, upon attempting to translate a virtual memory address to a physical memory address, the kernel or operating system does not find a valid protection key within the protection key registers 534, if the attempted access by the currently executing process is not compatible with the access mode in the TLB entry or the read/write/execute bits within the protection key in the protection key register, or if the privilege level at which the currently executing process executes is less privileged than the privilege level needed by the TLB entry, then a fault occurs that is handled by a processor dispatch of execution to operating system code.

Figure 6:
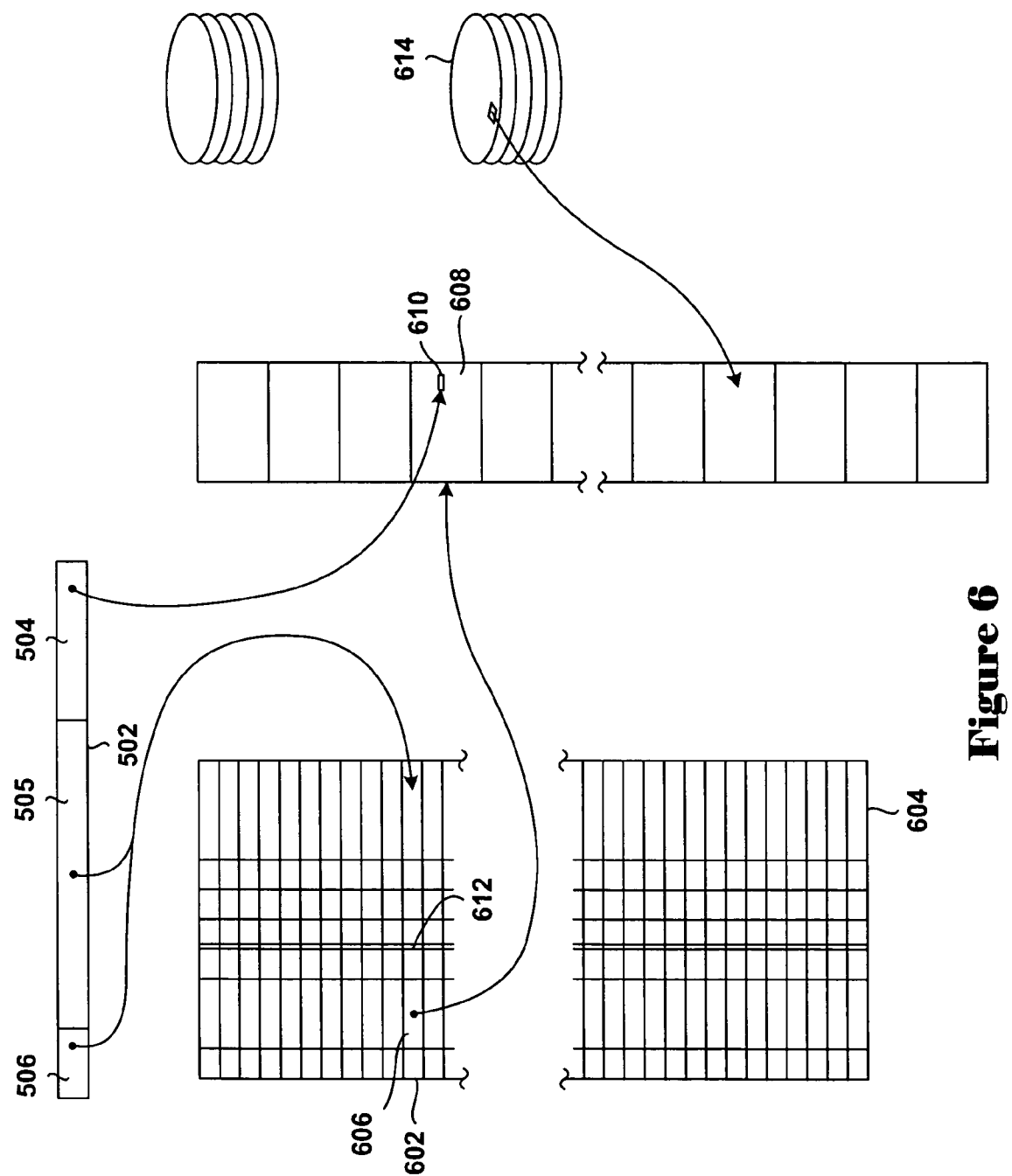
FIG. 6 shows the data structures employed by an operating system to find a memory page in physical memory corresponding to a virtual memory address.

FIG. 6 shows one form of a data structure employed by an operating system to find a memory page in physical memory corresponding to a virtual memory address. The virtual memory address 502 is shown in FIG. 6 with the same fields and numerical labels as in FIG. 5. The operating system employs the region selector field 506 and the virtual page address 505 to select an entry 602 within a virtual page table 604. The virtual page table entry 602 includes a physical page address 606 that references a page 608 in physical memory. The offset 504 of the virtual memory address is used to select the appropriate byte location 610 in the virtual memory page 608. The virtual page table 602 includes a bit field 612 indicating whether or not the physical address is valid. If the physical address is not valid, then the operating system commonly selects a memory page within physical memory to contain the memory page, and retrieves the contents of the memory page from an external storage device, such as a disk drive 614. The virtual page table entry 602 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

FIG. 7 shows the access rights encoding used in a TLB entry. Access rights comprise a 3-bit TLB.ar mode field 702 that specifies read, write, execute, and combination access rights, and a 2-bit TLB.pl privilege level field 704 that specifies the privilege level associated with a memory page. In FIG. 7, the access rights for each possible value contained within the TLB.ar and TLB.pl fields are shown. Note that the access rights depend on the privilege level at which a current process executes. Thus, for example, a memory page specified with a TLB entry with TLB.ar equal to 0 and TLB.pl equal to 3 can be accessed for reading by processes running at any privilege level, shown in FIG. 7 by the letter "R" in the column corresponding to each privilege level 706-709, while a memory page described by a TLB entry with TLB.ar equal to 0 and TLB.pl equal to 0 can be accessed by reading only by a process running at privilege level 0, as indicated in FIG. 7 by the letter "R" 710 under the column corresponding to privilege level 0. The access rights described in FIG. 7 nest by privilege level according to the previous discussion with reference to FIG. 4. In general, a process running at a particular privilege level may access a memory page associated with that privilege level and all less privileged privilege levels. Using only the access rights contained in a TLB entry, it is not possible to create a memory region accessible to a process running at level 3 and the kernel running at level 0, but not accessible to an operating system running at privilege level 2. Any memory page accessible to a process running at privilege level 3 is also accessible to an operating system executing at privilege level 2.

Figure 8A:
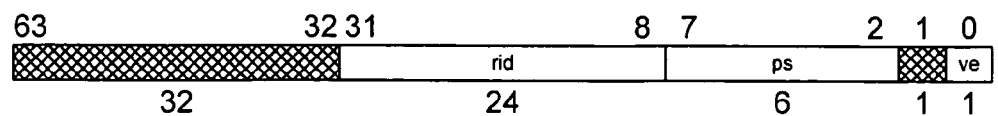
FIGS. 8A-B provide details of the contents of a region register and the contents of a VHPT long-format entry.
Figure 8B:
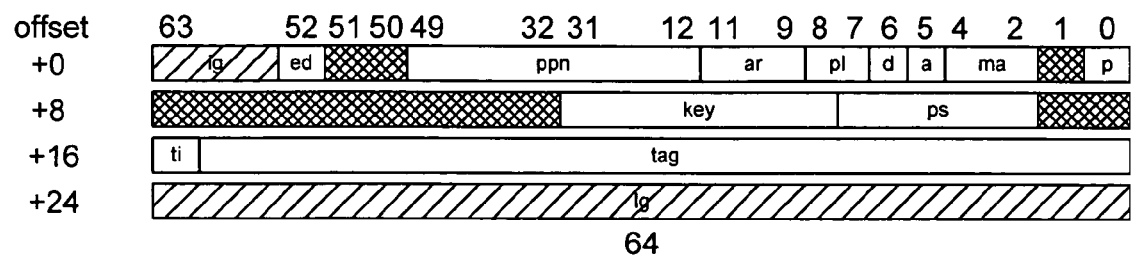

FIGS. 8A-B provide details of the contents of a region register and the contents of a VHPT long-format entry, respectively. As shown in FIG. 8A, a region register includes the following fields: (1) "ve," a 1-bit Boolean field indicating whether or not the VHPT walker is enabled; (2) "ps," a 6-bit field indicating a preferred page size for the region, where the preferred page size is $2^{ps}$; and (3) "RID," a region identifier, up to 24 bits in length. A VHPT long-format entry, as shown in FIG. 8B, includes the following fields: (1) "p," a 1-bit Boolean field indicating whether or not the corresponding page is resident in physical memory and other fields in the entry contain meaningful information; (2) "ma," a 3-bit field, called "memory attribute," which describes caching, coherency, write-policy, and speculative characteristics of the mapped physical page; (3) "a," a 1-bit field that, when zero, causes references to the corresponding page to generate access faults; (4) "d," a 1-bit Boolean field that specifies generation of dirty-bit faults upon store or semaphore references to the corresponding page; (5) "pl," a 2-bit field indicating the privilege level for the corresponding page; (6) "ar," a 3-bit access-rights field that includes the read, write, and execute permissions for the page; (7) "ppn," a 38-bit field that stores the most significant bits to the mapped physical address; (8) "ed," a 1-bit Boolean field whose value contributes to determining whether to defer a speculative load instruction; (9) "ps," a 6-bit field indicating the page size for virtual-memory mapping; (10) "key," a protection key associated with the corresponding virtual page; (11) "tag," a translation tag used for hash-base searching of the VHPT; and (12) "ti," a 1-bit Boolean field indicating whether or not the translation tag is valid.

Figure 9A:
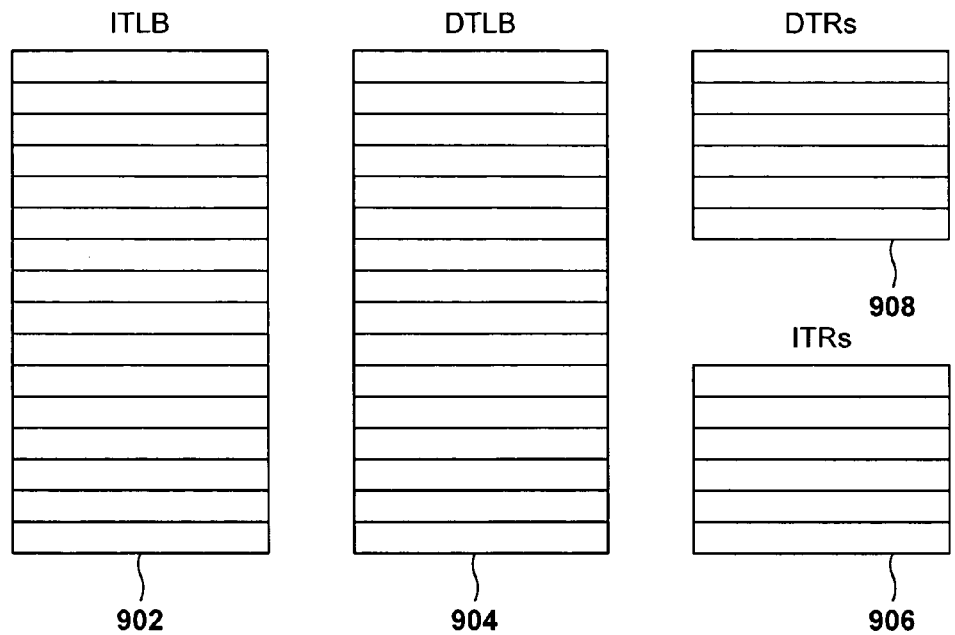
FIGS. 9A-B provide additional details about the virtual-memory-to-physical memory translation caches and the contents of translation-cache entries.
Figure 9B:
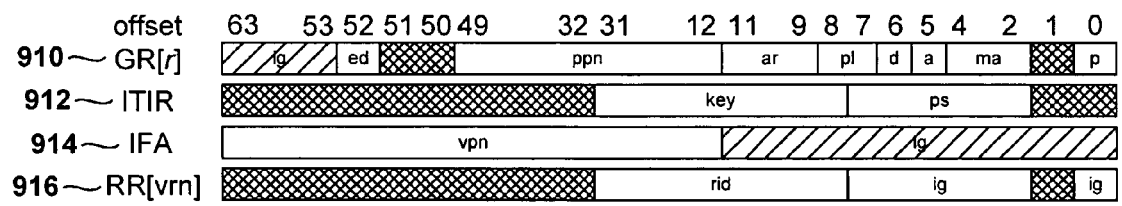

FIGS. 9A-B provide additional details about the virtual-memory-to-physical-memory translation caches and the contents of translation-cache entries. The Itanium provides four translation structures, as shown in FIG. 9A. These include an instruction TLB ("ITLB"), a data TLB ("DTLB") 904, a set of instruction translation registers ("ITRs") 906, and a set of data translation registers ("DTRs") 908. The four translation structures are together referred to as the "TLB." Entries are placed into the ITLB, DTLB, ITRs, and DTRs by using the privileged instructions itc.i, itc.d, itr.i, and itr.d, respectively. As discussed above, the ITLB and DTLB serve as a first cache for virtual-memory-to-physical-memory translations.

FIG. 9B shows the contents of registers used to insert translation-cache entries into the TLB using the above-described privileged instructions. The contents of four different registers are employed: (1) a general register 910 specified as an operand to the privileged instruction, the interruption TLB insertion register ("ITIR") 912, the interruption faulting address register ("IFA") 914, and the contents of the region register 916 selected by the most significant 3 bits of the IFA register 914. Many of the fields shown in FIG. 9B are identical to the fields in the VHPT long-format entry, shown in FIG. 8B, and are not again described, in the interest of brevity. The field "vpn" in the IFA register contains the most significant bits of a virtual-memory address. In both a VHPT entry and a translation-cache entry, the most significant bits of a physical page address and virtual-memory-page address (with page-offset bits assumed to be 0) represent the address of a first byte of a physical page and virtual-memory page, respectively. Thus, VHPT entries and TLB entries are referred to as corresponding both to virtual-memory addresses and to virtual-memory pages. The unspecified, least-significant bits of a physical-memory address or virtual-memory address an offset, in bytes, within the physical memory or virtual memory page specified by the most significant bits.

Figure 10:
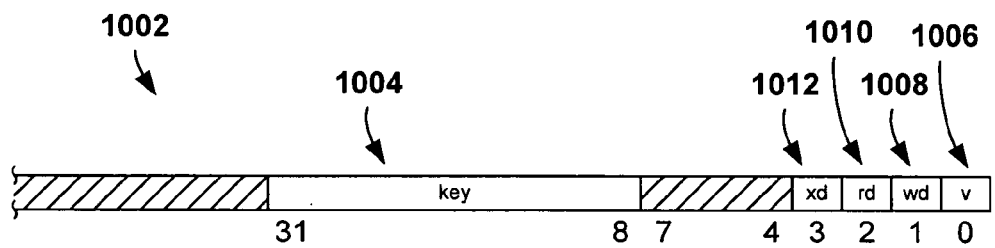
FIG. 10 provides additional details regarding the contents of protection-key registers.

FIG. 10 provides additional details regarding the contents of protection-key registers. The format for a protection-key register 1002 includes a key field up to 24 bits in width 1004 and four different single-bit fields that include: (1) a valid bit 1006, which indicates whether or not the protection-key register contains valid contents and is therefore employed by the processor during virtual-address translation; (2) a write-disable bit 1008, which, when set, results in write access denied to pages, the translations for which include the protection key contained in the protection-key field 1004; (3) a read-disable bit, which, when set, disables read access to pages, the translations for which contain the key contained in the key field 1004; and (4) an execute-disable bit 1012, which, when set, prevents execute access to pages, the translations for which contain the key contained in the key field 1004. The read-disable, write-disable, and execute-disable bits in protection key registers provide an additional mechanism to control access to pages, on a key-domain basis rather than on a per-page-access-rights basis.

Embodiments of the Present Invention

One embodiment of the present invention is described below, with references to FIGS. 11-14, which display, in schematic form, components of the virtual-address translation mechanism provided by the Itanium architecture, discussed above with reference to FIGS. 15 and 16. Following this schematic-level discussion of an embodiment of the present invention, a flow-control diagram is provided, in FIG. 15, detailing the virtual-address translation process carried out according to one embodiment of the present invention. Alternative approaches used in additional embodiments are described throughout the following discussion.

Figure 11:
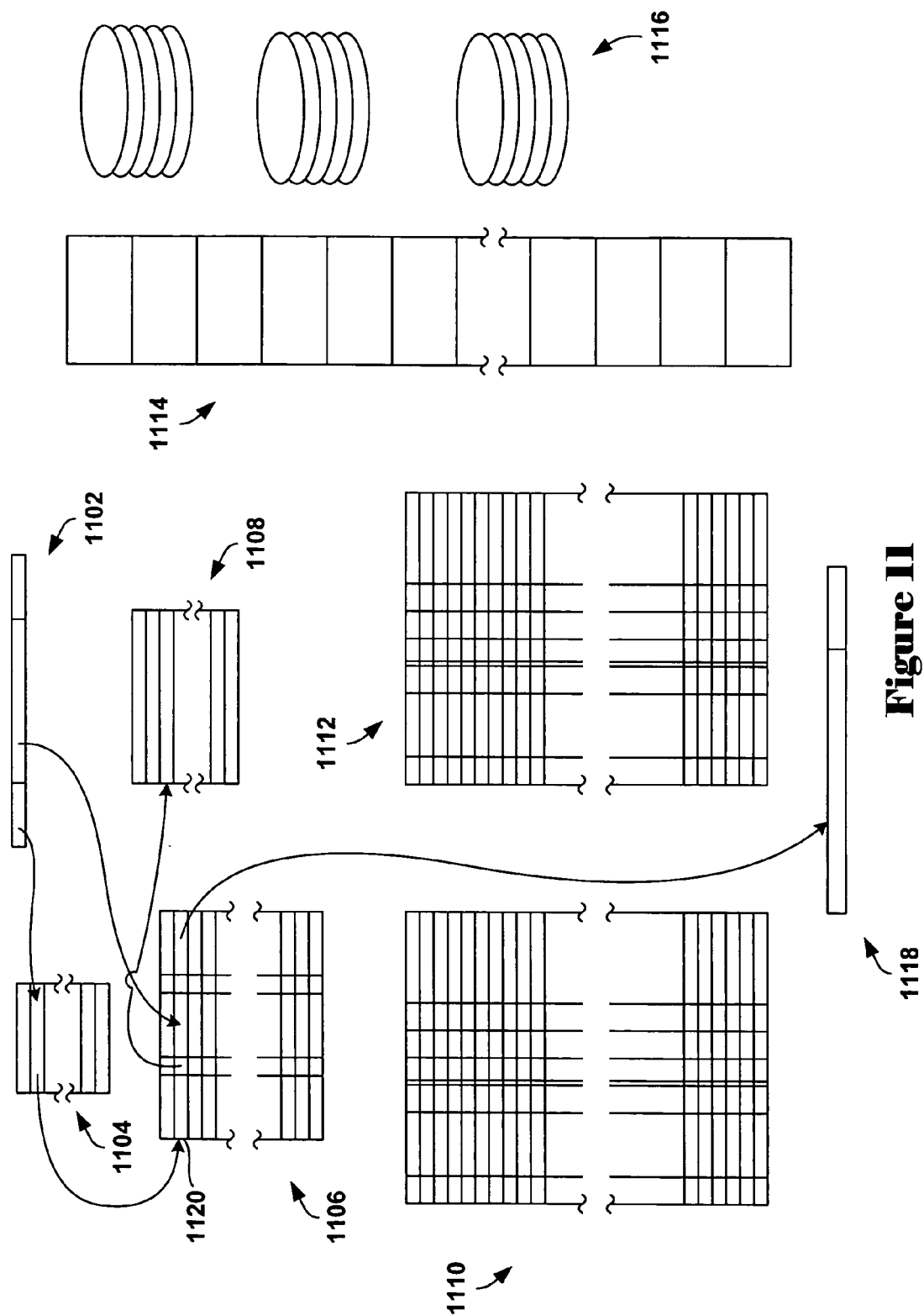
FIG. 11 illustrates, in schematic form, components of the virtual-address translation mechanism provided by the Itanium architecture, and displays indications on how a virtual address is translated, through a translation included in the TLB, to a physical address.

FIG. 11 illustrates, in schematic form, components of the virtual-address translation mechanism provided by the Itanium architecture, and displays indications on how a virtual address is translated, through a translation included in the TLB, to a physical address in one embodiment of the present invention. The virtual-address-translation-mechanism components shown in FIG. 11, and in FIGS. 12-14, described below, include a virtual address to be translated 1102, a portion of the region registers 1104, the TLB 1106, a portion of the protection-key registers 1108, the host VHPT 1110 used by the virtual-machine monitor and hardware VHPT walker, a guest VHPT 1112 used by a guest operating system, physical memory 1114, mass-storage backup for physical memory 1116, and the final, translated physical address 1118 corresponding to the virtual address 1102 to be translated.

In one embodiment of the present invention, as shown in FIG. 11, the virtual-machine monitor maintains complete control over the TLB 1106 and VHPT 1110 in order to completely control physical memory resources of the computer system. The virtual-machine monitor provides a guest-physical memory interface to guest operating systems, each of which maintains a guest VHPT 1112 under the illusion that the guest VHPT is, in fact, the host VHPT used by the hardware walker. The virtual-machine monitor also, as discussed below, virtualizes certain control registers, emulates thash and ttag instructions on behalf of the guest operating systems, and carefully translates all guest-physical memory addresses used by guest operating systems to physical memory addresses. The thash instruction computes an address in the VHPT corresponding to a virtual-memory address supplied as an argument to the thash instruction. This address is either a linear page-table-entry address, in the case of a short-format VHPT, or an implementation-specific hash value that can be used, along with a tag value returned by the ttag instruction, to locate a virtual-address translation for a virtual-memory address in a long-format VHPT. An advantage of methods of the present invention is that, for the most part, the virtual-machine monitor virtualizes physical memory and translation mechanisms without significant virtual-monitor-introduced overhead, relying on features of the processor to quickly and efficiently translate virtual addresses, on behalf of guest operating systems, to physical addresses.

In FIG. 11, the virtual address 1102 is translated, at the hardware level, by access to a virtual-address translation 1120 stored in the TLB 1106. The hardware uses the region-register field and page-address field of the virtual address 1102 to generate a TLB-entry location indication to quickly locate the translation for the virtual address in the TLB. If a translation is found, and if the page-access rights and protection key included in the translation provide appropriate access rights to the guest operating system, then the physical page address is obtained from a physical-page-address field of the virtual-address translation 1102 and combined with the page offset from the original virtual address to produce a final, physical memory address. These steps are identical to the steps discussed with referenced to FIG. 5 above. However, they are repeated to emphasize that, when the translation is found in the TLB, as is normally the case during machine operation, virtual-address translation occurs by the very same mechanisms that it occurs in the computer system without a virtual-machine monitor, exposing the machine interface directly to an operating system. Thus, for the bulk of virtual-address translations, no virtual-monitor inefficiencies or overheads are introduced.

Figure 12:
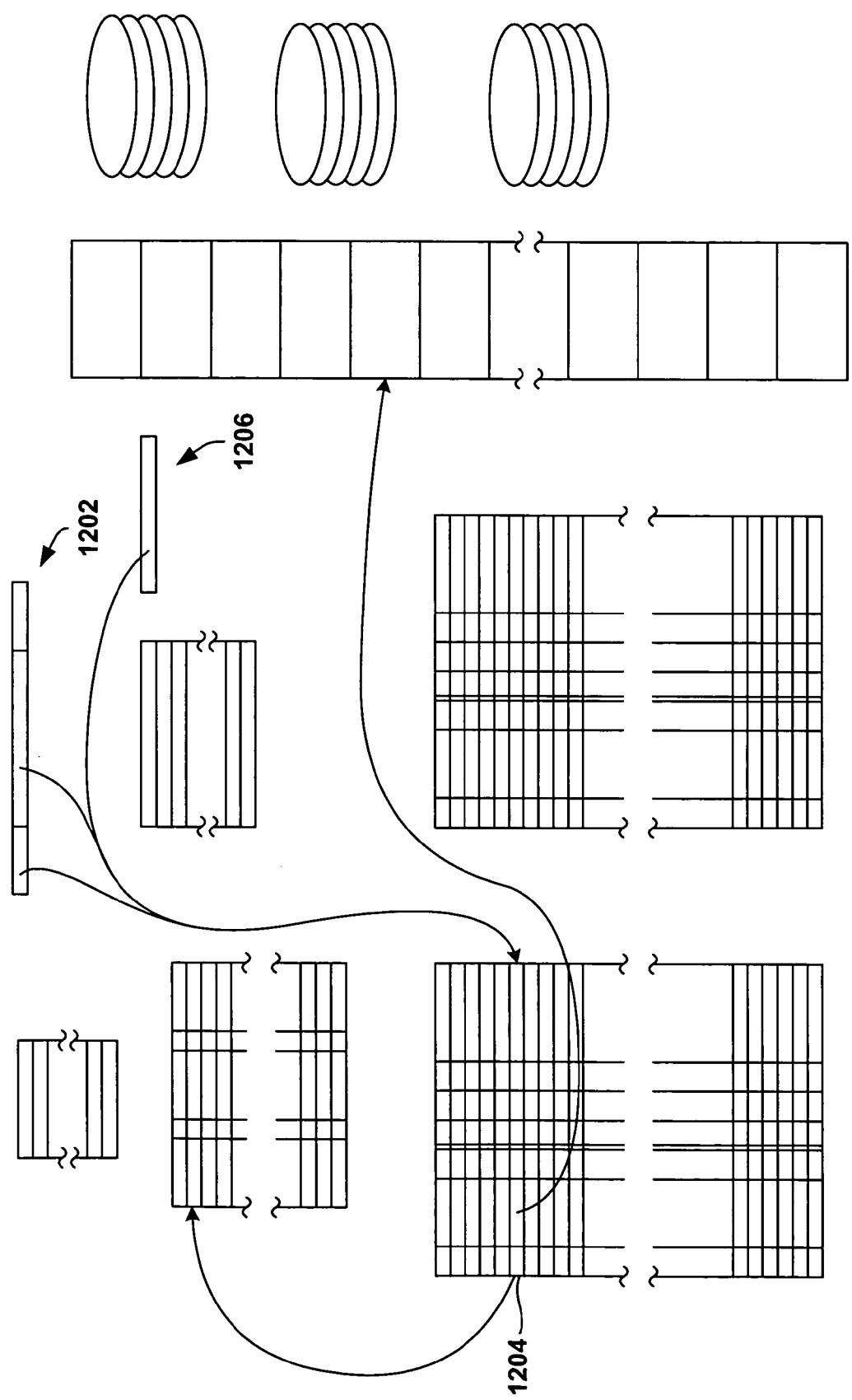
FIG. 12 illustrates handling of a TLB miss by methods that represent one embodiment of the present invention.

FIG. 12 illustrates handling of a TLB miss by methods that represent one embodiment of the present invention. The steps discussed, below, with respect to FIG. 12, are identical to steps previously discussed with respect to FIG. 6, above. These steps are repeated in order to demonstrate that, in the guest-physical memory interface provided by a virtual-machine monitor to a guest operating system, TLB misses may be identically handled as in a computer system without a virtual-machine monitor, exposing the machine interface directly to an operating system. As shown in FIG. 12, when a translation is not found in the TLB, the hardware employs the contents of the region field and page-address fields of the virtual address 1102, along with the contents of the PTA control register 1202 that stores the physical memory address of the VHPT, used during execution of thash and ttag instructions to compute a value that allows the hardware to locate a position within the VHPT 1204 at which a translation for the virtual address 1102 should be found, or during TLB-miss fault handling. If the proper translation is found at the determined position in the VHPT, and if the translation is valid, as indicated by the valid bit being set within the translation, then a physical-address field within the translation references a memory page corresponding to the virtual-page address within the virtual-memory address 1102. In this case, the translation can be moved from the VHPT to the TLB, and virtual-address translation automatically completed by the hardware. Note that the host VHPT 1110 maintained by the virtual-machine monitor includes host physical memory addresses in the translations, as does the TLB.

Figure 13:
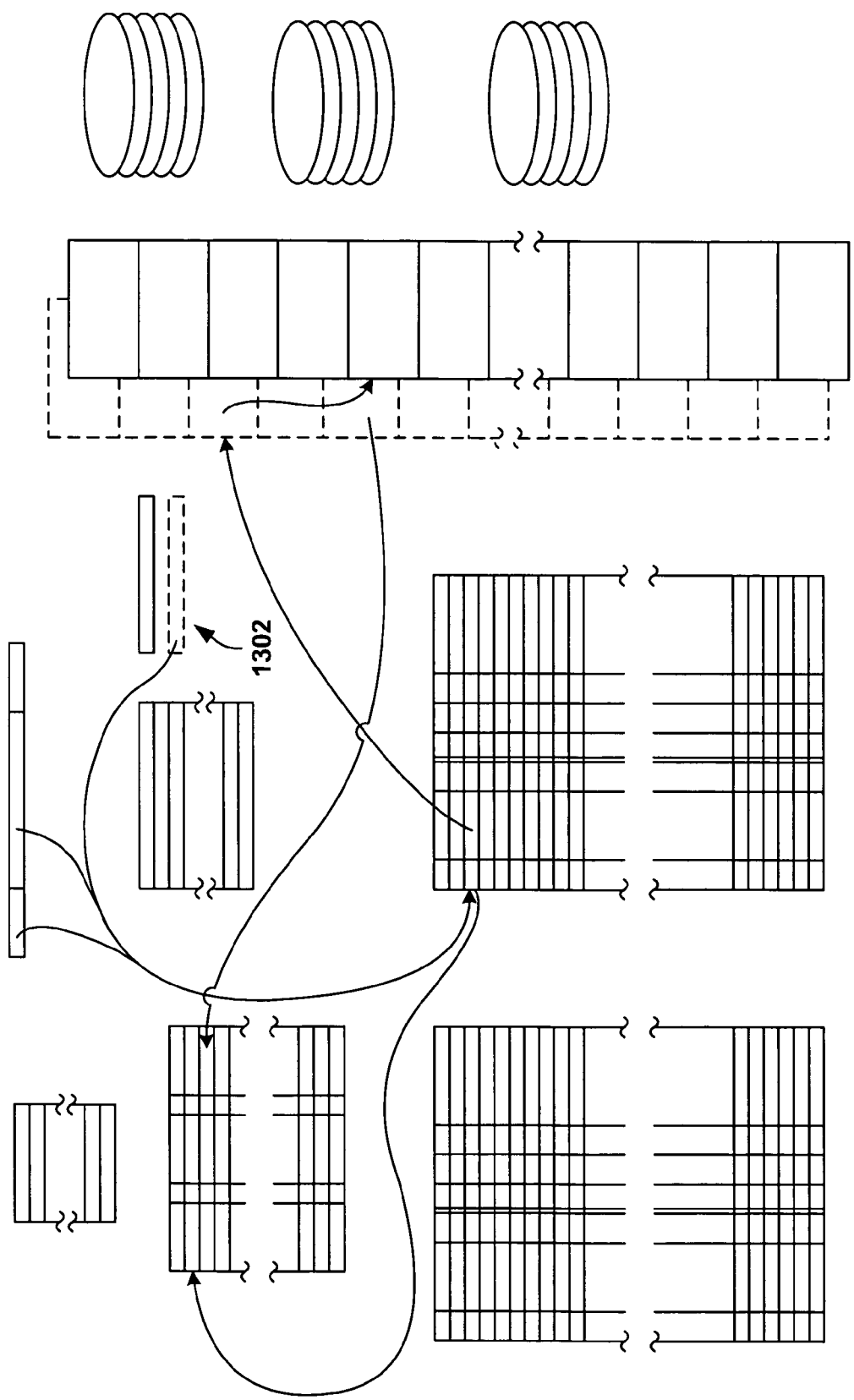
FIG. 13 illustrates a first step in a method for resolving TLB misses for which a valid translation is not found in the host VHPT that respresents one embodiment of the present invention.

If, on the other hand, a translation is not found within the VHPT upon a TLB miss, then the virtual-machine monitor and guest operating system need to coordinate activities in order to resolve the TLB miss and translate the virtual address. FIG. 13 illustrates a first step in resolving TLB misses for which a valid translation is not found in the host VHPT. In this case, the virtual-machine monitor intercepts a TLB-missed fault and forwards the TLB-miss fault to the guest operating system. The guest operating system responds to the TLB-miss fault as if a translation was not found in the TLB, but may be found in the guest VHPT that the guest operating system considers to be the host VHPT. The guest operating system explicitly uses a thash instruction, or thash and ttag instructions, to compute a VHPT-entry location indication or relies on a VHPT location indication computed on behalf of the guest operating system by the virtual-machine monitor when the guest operating system accesses a control register that stores the computed VHPT-entry location indication upon TLB-miss faulting. Note that, in order to practice this method of the present invention, the virtual-machine monitor must either statically or dynamically emulate thash and ttag instructions on behalf of the guest operating system. As part of that emulation, the virtual-machine monitor virtualizes the PTA control register 1302 in order to compute an indication of the location for the translation in the guest VHPT, rather than an indication of the location in the host VHPT. Thus, the guest operating system can compute an indication of the location of the translation in the guest VHPT by the same techniques that an operating system running directly on the machine would use to compute an indication of the location of the translation in the host VHPT. An efficient method for dynamic detection of ttag and thash instructions by a virtual-machine monitor is disclosed in related U.S. patent application Ser. No. 10/909, 965, assigned to the Hewlett-Packard Corporation and filed on Jul. 31, 2004, hereby incorporated by reference.

The guest operating system next checks whether a valid translation can be found in the guest VHPT. Note that the physical-page-address field of a translation in the guest VHPT includes a guest-physical-page address, representing a guest-operating-system's view of guest-physical memory provided by the virtual-machine monitor. If a valid translation is found, then the virtual-machine monitor intercepts execution by the guest operating system of an itr instruction, used by the guest operating system to insert the translation into the TLB, replacing the guest-physical-page address in the guest VHPT translation with a physical-page address before inserting the translation into the TLB on behalf of the guest operating system. Note that the virtual-machine monitor easily intercepts any attempt by a guest operating system to access privileged resources, such as the TLB, or execute privileged instructions, such as the itr instruction, because only the virtual-monitor runs at the most privileged privilege-level, at which faults and interruptions are initially handled.

Figure 14:
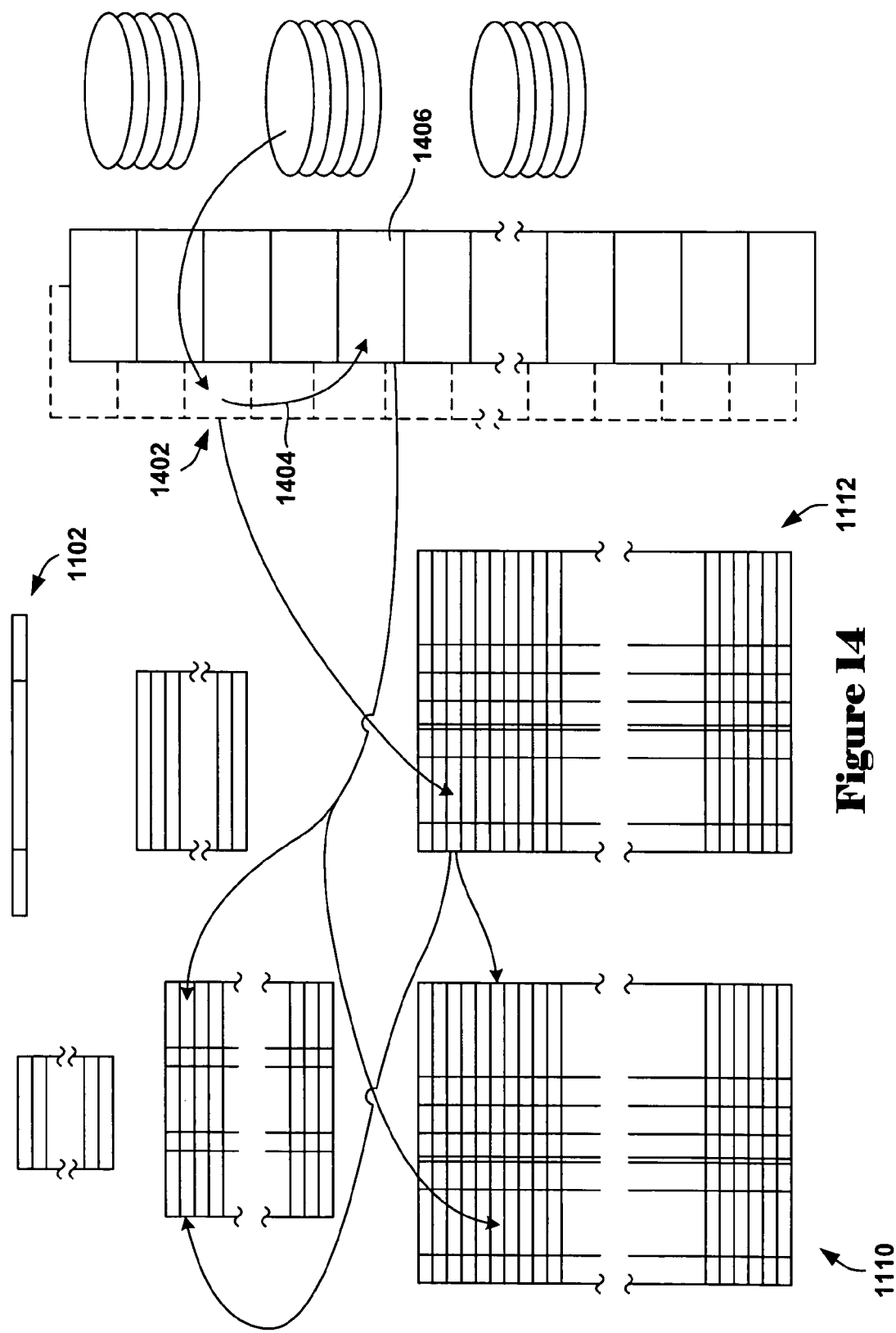
FIG. 14 illustrates the methods, in one embodiment of the present invention, by which the guest operating system and virtual-machine monitor handle absence of a valid translation in the guest VHPT during virtual-address translation in a virtual-monitor-supported virtual-machine interface.

FIG. 14 illustrates the methods by which the guest operating system and virtual-machine monitor handle absence of a valid translation in the guest VHPT during virtual-address translation in a virtual-monitor-supported virtual-machine interface. In the case that the guest operating system does not find a valid translation in the guest VHPT 1112, the guest operating system employs normal operating-system methodology to locate an appropriate physical memory page for the virtual address, allocating a physical page if necessary, and, if the page has been previously paged out, moving the contents of the page to physical memory from a mass storage device. As shown in FIG. 14, the guest operating system employs guest-physical memory addresses for accessing memory. These memory-access operations are intercepted by the virtual-machine monitor, and the guest-physical memory addresses supplied by the guest operating system are converted to physical memory addresses by the virtual-machine monitor. For example, in FIG. 14, the guest operating system locates an appropriate guest-physical page 1402 corresponding to the virtual address 1102, but the virtual-machine monitor translates 1404 that guest-physical memory address to a virtual-machine-monitor-level physical memory address, referred to as a "host physical memory address," of a physical memory page 1406. The guest operating system then enters the appropriate translation into the guest VHPT using the guest-physical memory address. The guest operating system then attempts to insert the virtual-address translation into the TLB using an itc instruction. The virtual-machine monitor intercepts the itc instruction, inserts the host physical-memory address corresponding to the guest-physical address in place of the guest-physical address within the translation, inserts the translation into the host VHPT 1110, and also inserts the translation into the TLB on behalf of the guest operating system. A similar process is used for insertions into translation registers using the itr instructions.

Thus, as discussed above with reference to FIGS. 11-14, a guest operating system is under the illusion that the guest operating system is managing a VHPT, TLB, and physical memory in order to support virtual memory, just as the guest operating system would manage these resources on a bare-machine interface. However, the virtual-machine monitor creates and maintains the host virtual-address-translation components and provides a guest VHPT and guest-virtual-address-translation-system interface to guest operating systems. In this fashion, the virtual-machine monitor can allocate different portions of physical memory to each of different, concurrently running guest operating systems, giving each guest operating system the illusion that guest operating system alone is managing the entire resources of the computer system. The host VHPT essentially serves as an extended TLB for each guest operating system. Note also that the virtual-machine monitor can use both the TLB and VHPT not only for storing translations for guest operating systems, but also for storing virtual-address translations for its own purposes, including virtual-monitor-specific virtual memory. In one embodiment of the present invention, the virtual-machine monitor employs a long-format VHPT for the host VHPT, and guest operating systems can use either long-format or short-format guest VHPTs.

Figure 15:
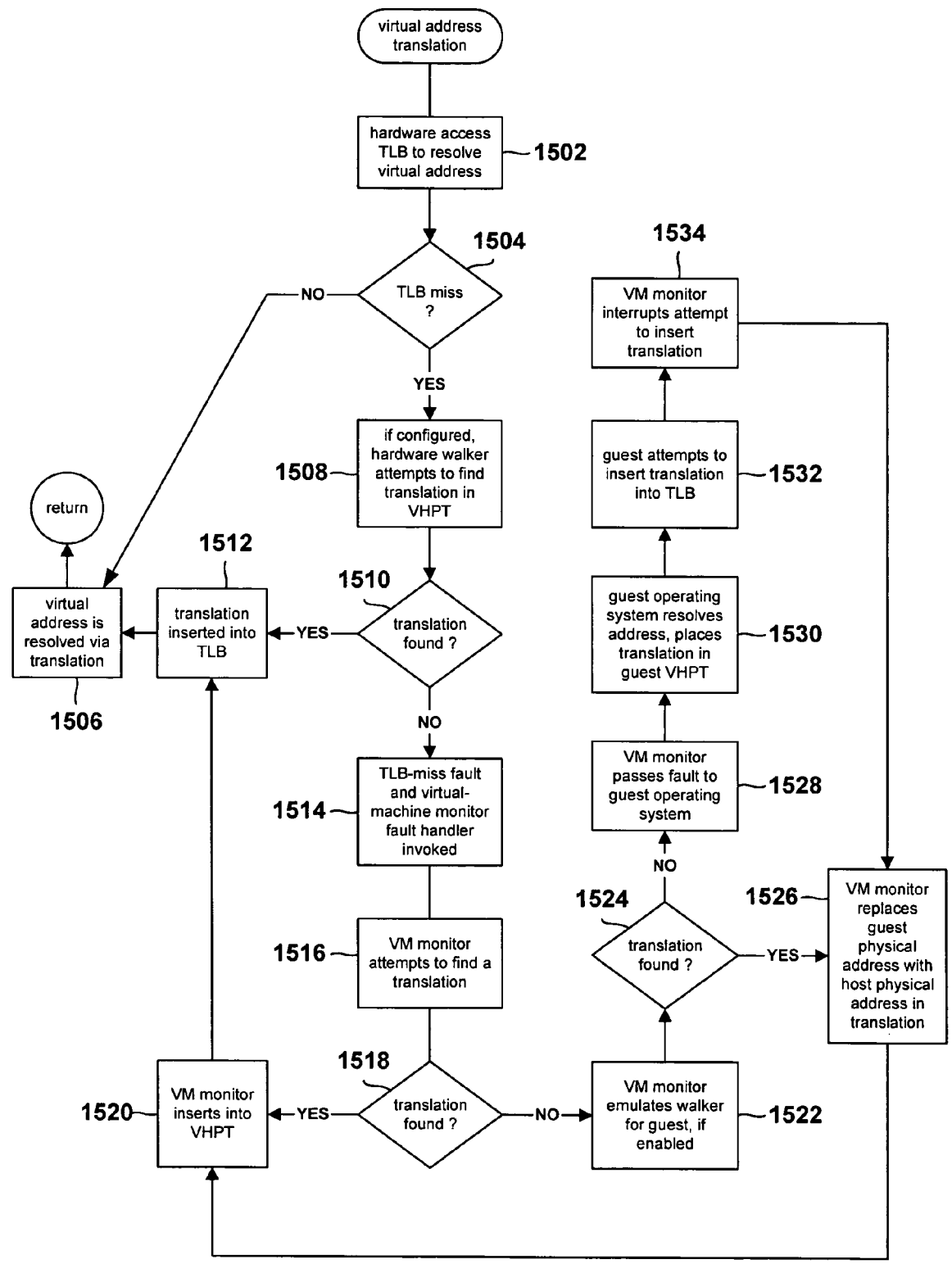
FIG. 15 provides a control-flow diagram for virtual-address translation carried out cooperatively by a virtual-machine monitor and a guest operating system in various embodiments of the present invention.

FIG. 15 provides a control-flow diagram for virtual-address translation carried out cooperatively by a virtual-machine monitor and a guest operating system under various embodiment of the present invention. In step 1502, the hardware-level virtual-address-translation mechanism is invoked as a result of an attempt by a process running on the computer to access a virtual-address-specified memory location. In step 1504, if the hardware finds a corresponding virtual-address translation in the TLB, then control is transferred to step 1506, where the virtual-address is automatically resolved by the hardware to produce a host physical address, allowing access to the physical memory location corresponding to the guest-virtual address. However, if a TLB miss occurs, and if a hardware walker is enabled, the hardware walker, or a virtual-monitor supplied software walker, accesses the host VHPT to find an appropriate virtual-address translation, in step 1508, and if the walker finds a translation, as determined in step 1510, the walker inserts it into the TLB in step 1512. Otherwise, as detected in step 1510, a TLB miss and VHPT miss has occurred. In this case, then a hardware fault is delivered, and a virtual-machine-monitor fault handler is invoked, in step 1514, and then attempts to find a translation in page tables or other structures in step 1516. If the virtual-monitor fault handler finds a translation, as determined in step 1518, then the virtual-monitor fault handler inserts the translation into the host VHPT and TLB, in steps 1520 and 1512. Otherwise, the virtual-monitor fault handler emulates a hardware walker on behalf of the guest operating system, if the guest operating system has configured a walker, and searches for a translation in the guest VHPT, in step 1522, using a thash instruction, or ttag and thash instructions and a virtualized PTA control register, to compute an indication of the location of an appropriate virtual-address translation in the guest VHPT. If an appropriate virtual-address translation is found in the guest VHPT, as detected in step 1524, then the virtual-machine-monitor replaces the guest-physical-memory address in the translation with a host physical memory translation, in step 1526, and the fault handler inserts the found virtual-address translation into the host VHPT and TLB, in steps 1520 and 1512. If a translation is not found in the guest VHPT, or the guest operating system has not configured a walker, then, in step 1528, the fault is passed by the virtual-machine monitor to the guest operating system, in step 1528, and the guest operating system resolves the virtual address to a guest-physical-memory address by accessing page tables or other structures, in step 1530. If the guest operating system needs to restore contents of the corresponding guest-physical page from a mass storage device, then the guest operating system attempts the mass-storage-device access and physical memory access. The virtual-machine monitor intercepts physical-memory accesses, replacing the guest-physical memory address provided by the guest operating system with host physical memory addresses. Also in step 1530, the guest operating system uses an emulated thash instruction or thash and ttag instructions and the virtualized PTA control register values to identify a location in the guest VHPT to insert a translation to a guest-physical memory address for the guest-physical memory address corresponding to the virtual address to be translated and optionally inserts a virtual-address translation into the guest VHPT that includes the guest-physical memory address. Finally, in step 1532, the guest operating system attempts to insert the address translation into the TLB, using an itc instruction. The virtual-machine monitor intercepts execution of the itc instruction, in step 1534, and puts a virtual-address translation that includes a host physical memory address rather than the guest-physical memory address both into the host VHPT and into the TLB on behalf of the guest operating system in steps 1520 and 1512.

Although the present invention has been described in terms of a particular embodiment, it is not intended that the invention be limited to this embodiment. Modifications within the spirit of the invention will be apparent to those skilled in the art. For example, any number of different code-recognizing routines may be implemented to carry out methods of the present invention, using a variety of different control structures, modular organizations, data structures, and other programming parameters. Methods of the present invention may be employed to recognize particular instructions and instruction blocks in any machine language in which instructions comprise discrete op-code and operand fields. Instruction-recognizing routines may contain additional logic and use additional stored data to logically analyze interaction-field values to make higher-level determinations of whether or not a particular code sequence constitutes a pattern to be detected. For example, the additional logic may apply inference rules to determine whether register use is consistent for the purposes of the instruction block that is to be recognized.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for virtualizing physical memory and virtual-address translation by a virtual-machine monitor, the method comprising:
   providing a guest-processor-page table employed by a guest operating system; and
   resolving a translation-lookaside-buffer-miss fault by
      first seeking a virtual-address translation in a virtual-monitor-maintained host virtual-hash-page table, and
      when a virtual-address translation cannot be found in the host virtual-hash-page table,
         seeking a virtual-address translation in the guest-processor-page table to find the virtual-address translation, and, if a virtual-address translation cannot be found in the guest-processor-page table, passing the translation-lookaside-buffer-miss fault to the guest operating system.

2. The method of claim 1 wherein virtual-address translations stored in the translation-lookaside-buffer and virtual-monitor-maintained virtual-hash-page table both contain host physical memory addresses.

3. The method of claim 1 wherein virtual-address translations stored in the guest-processor-page table contain guest-physical memory addresses.

4. The method of claim 1 further including, following passing of the translation-lookaside-buffer-miss fault to the guest operating system:
   resolving the translation-lookaside-buffer-miss fault by the guest operating system to produce a guest-physical memory address;
   inserting a virtual-address translation into the guest-processor-page table by the guest operating system that includes a guest-physical memory address; and
   intercepting insertion of the virtual-address translation into the translation-lookaside buffer by the virtual-machine monitor, which replaces the guest-physical address in the virtual-address translation with a physical memory address and placing the virtual-address translation into the virtual-monitor-maintained virtual-hash-page table and the translation-lookaside-buffer.

5. Computer-readable instructions encoded in a computer-readable memory or stored on a computer-readable data-storage device that implement a method, for virtualizing physical memory and virtual-address translation by a virtual-machine monitor, by:
   providing a guest-processor-page table employed by a guest operating system; and
   resolving a translation-lookaside-buffer-miss fault by
      first seeking a virtual-address translation in a virtual-monitor-maintained host virtual-hash-page table, and
      when a virtual-address translation cannot be found in the host virtual-hash-page table,
         seeking a virtual-address translation in the guest-processor-page table to find the virtual-address translation, and, if a virtual-address translation cannot be found in the guest-processor-page table, passing the translation-lookaside-buffer-miss fault to the guest operating system.

6. A virtual-machine monitor that virtualizes physical memory and virtual-address translation by:
   providing a guest-processor-page table employed by a guest operating system; and
   resolving a translation-lookaside-buffer-miss fault by
      first seeking a virtual-address translation in a virtual-monitor-maintained host virtual-hash-page table, and
      when a virtual-address translation cannot be found in the host virtual-hash-page table,
         seeking a virtual-address translation in the guest-processor-page table to find the virtual-address translation, and, if a virtual-address translation cannot be found in the guest-processor-page table, passing the translation-lookaside-buffer-miss fault to the guest operating system.

* * * * *